United States Patent

Nagai et al.

[11] Patent Number: 5,820,800
[45] Date of Patent: *Oct. 13, 1998

[54] VACUUM SUCTION PADS, AND METHOD FOR MANUFACTURING SAME

[75] Inventors: Shigekazu Nagai; Shuuzou Sakurai; Tadasu Kawamoto, all of Yawara-mura, Japan

[73] Assignee: SMC Corporation, Tokyo, Japan

[ * ] Notice: The term of this patent shall not extend beyond the expiration date of Pat. No. 5,639,553.

[21] Appl. No.: 713,530

[22] Filed: Sep. 13, 1996

Related U.S. Application Data

[63] Continuation of Ser. No. 50,239, filed as PCT/JP92/01165 Sep. 11, 1992, Pat. No. 5,639,553.

[30] Foreign Application Priority Data

Sep. 11, 1991 [JP] Japan .................................. 3-259787

[51] Int. Cl.$^6$ ................................................. B29C 71/00
[52] U.S. Cl. ........................... 264/83; 264/233; 264/232; 428/409
[58] Field of Search ............................ 264/83, 232, 233, 264/129, 340, 347; 428/409, 36.8, 217, 492, 493; 248/205.7, 206.2, 363; 362/397; 427/255.4, 400; 524/406; 525/329.3, 332.3

[56] References Cited

U.S. PATENT DOCUMENTS

| | | | |
|---|---|---|---|
| 3,997,935 | 12/1976 | Porter et al. | 264/340 |
| 4,554,326 | 11/1985 | Kowalski et al. | 525/354 |
| 4,650,832 | 3/1987 | Kowalski et al. | 525/354 |
| 4,771,093 | 9/1988 | Nakane et al. | 524/225 |
| 5,549,340 | 8/1996 | Nagai et al. | 294/64.1 |

FOREIGN PATENT DOCUMENTS

| | | |
|---|---|---|
| 38-028107 | 12/1963 | Japan . |
| 57-057641 | 6/1982 | Japan . |
| 57-156235 | 9/1982 | Japan . |

*Primary Examiner*—Jan H. Silbaugh
*Assistant Examiner*—Suzanne E. Mason
*Attorney, Agent, or Firm*—Oblon, Spivak, McClelland, Maier & Neustadt, P.C.

[57] ABSTRACT

The invention relates to a method for manufacturing vacuum suction pads, in which, in addition to reductions of contaminant components, the material of vacuum suction pads is subjected to an improved surface treatment which prevents deposition of pad marks on work surfaces and reduces frictional resistance of suction pads on work surfaces to lessen their fatigue. Suction pads of synthetic rubber, to be connected to a vacuum source, are each formed with a thin halogenation-hardened layer at least on a sucking surfaces to be held in contact with a work surface.

4 Claims, 1 Drawing Sheet

VACUUM SUCTION PADS, AND METHOD FOR MANUFACTURING SAME

This is a continuation of application Ser. No. 08/050,239, filed as PCT/JP92/01165 Sep. 11, 1992, now U.S. Pat. No. 5,639,553.

BACKGROUND OF THE INVENTION

1. Field of the Art

This invention relates to a vacuum suction pad useful for attracting, fixing, holding or transferring work or the like by suction force, and a method for manufacturing such suction pads.

2. Description of the Prior Art

Vacuum suction pads, formed of synthetic rubber or flexible synthetic resin material, have been resorted to, for example, in sucking and transferring work such as glass sheets, silicon wafers, liquid crystal material, cathode ray tubes and the like. However, in many cases a suction pad of this sort tends to leave a pad mark on a work surface which has been in contact with the pad.

Such pad marks are mainly attributable to exudation of oily contaminant substances from the pad material, and have possibilities of not only impairing the surface condition of work but also giving adverse effects as contaminants to the atmosphere of a clean room or other spaces where pieces of work undergo a manufacturing process. Besides, such contaminants are likely to cause troubles in a later stage, for example, troubles in the stage of a surface treatment, troubles in the stage of deposition of fluorescent material on cathode ray tubes, or troubles in the stage of bonding liquid crystal with other thin sheet material. Further, the contaminants might be chemically bonded to the material of work in some cases.

Especially in case of vacuum suction pads, even if they are free of exudation under normal conditions, they have possibilities of leaving pad marks after they are internally evacuated to suck a piece of work thereto or when they contain a component which has possibilities of exudation under certain condisions, for example, in depressurized conditions.

There have been made various attempts to overcome the problem of pad marks by improving the composition of the pad material through reductions of the contents of contaminant components. However, so far these attempts have barely succeeded in achieving satisfactory results, in consideration of the influences on the physical properties and workability of the pad material. Therefore, some products require to include a step of wiping off pad marks of the suction pads in a succeeding stage, resulting in an increased number of steps of the manufacturing process. Attempts have also been made to prevent the deposition of pad marks, for example, by the use of a vacuum suction pad which has thin cloth-like fibrous material wrapped or bonded on its sucking surface or inner surface to prevent its direct contact with a work. This measure may succeed in preventing deposition of pad marks but lends itself to degradations in sucking capability of the pad.

Besides, the suction pads are repeatedly subjected to deformations and localized loads to undergo considerable fatigue as they are pressed against work, so that, in addition to the above-mentioned problem of pad marks, it is important to lessen their fatigue and wear by minimizing their frictional resistance on work surfaces to be sucked.

SUMMARY OF THE INVENTION

In view of the foregoing situations failing to produce satisfactory effects despite the considerations to the reduction of contaminant components of vacuum suction pads, the present invention has as its object the provision of an improved vacuum suction pad which is free of the possibilities of depositing pad marks on work surfaces, and a method for manufacturing such a suction pad.

With a view to achieving the above-stated objective, the present inventors have conducted intensive studies and as a result succeeded in obtaining experimental results confirming that a halogenation treatment on synthetic rubber is extremely effective for suppressing exudation of contaminant components, which primarily consist of oily substances, even under vacuum conditions, and that the halogenation treatment may be of a very simple one and is also effective for minimizing the frictional resistance of suction pads to suppress their deformations and localized load distribution, without affecting the sucking capability of the pads.

The present invention has been achieved on the basis of the foregoing findings, and concerns a vacuum suction pad of synthetic rubber designed to be connected to a vacuum source, characterized in that the suction pad is formed with a thin halogenation-hardened surface layer by a halogenation treatment at least on a surface to be put in a depressurized state at the time of sucking operation. Of course, the just-mentioned halogenation treatment may be effected on the entire surfaces of the pad if desired.

According to the present invention, there is also provided a method for manufacturing the above-mentioned suction pad, which is characterized by molding and vulcanizing synthetic rubber in a pad shaping mold, and subjecting the resulting suction pad to a halogenation treatment.

The vacuum suction pad according to the present invention is formed of synthetic rubber which is molded into a generally adopted pad shape suitable for connection to a vacuum source, the vacuum pad having, as mentioned hereinbefore, an extremely thin halogenation-hardened surface layer formed by a halogenation treatment at least on a surface which is to be put in a depressurized state at the time of the sucking operation.

Table 1 below shows chemical compositions which can be suitably used for the vacuum suction pad according to the invention.

TABLE 1

| Components | Contents |
| --- | --- |
| NBR Polymer JSR N239SV (product of Nippon Synthetic Rubber Co.) | 100 |
| Activated zinc flower (v. assisting agent) | 5–7 |
| Stearic acid (dispersant) | 0.5–1.5 |
| SRF carbon (reinforcing agent) | 0.5–3 |
| White carbon (silica-base filler) | 10–35 |
| Thiuram type v. accelerator TRA | 2–2.5 |

The diene type synthetic rubber material which constitutes the vacuum suction pad generally contains various additives, forming a complicated composite system in which such additives physically and chemically influence each other in imparting the aimed properties of the pad material. Accordingly, the contents of the respective components, shown in Table 1, are limited to such ranges as would not impair the physical properties and workability of the synthetic rubber, while suppressing the contents of contaminant substances in the composition to a minimum as a countermeasure for precluding deposition of pad marks on work surfaces.

In the above-defined composition, the content of activated zinc flower, which serves as a vulcanization assisting agent, should not be less than the lower limit since otherwise there will arise problems such as an unduly prolonged vulcanization time or failures of curing or molding the pad material to shape. The content of stearic acid, a dispersant, should not exceed the upper limit since otherwise the molding will become infeasible. The content of SRF carbon (Semi-Reinforcing Furnace Black) should not exceed the upper limit since otherwise it will bring about contamination in an increased degree. The content of white carbon to be blended as a filler in place of carbon black (SRF carbon) should be within the limited range since an excessive white carbon content will harden the pad to an excessive degree which is unsuitable for a suction pad. The content of TRA, a vulcanizing agent or a vulcanization accelerating agent, should not be less than the lower limit since otherwise the vulcanization will become too slow. Further, in case of nitrile butadiene rubber, for preventing deposition of pad marks, it is relatively effective to exclude from the composition an aliphatic ester compound of high molecular weight and an inorganic silicate compound which will become a great cause of the undesirable pad marks.

In the present invention, the pad material is not restricted to the synthetic rubber of the above-defined composition, and may be blended with natural rubber of various diene-base rubber.

In forming suction pads from compositions in the above-described range, it is desirable to take into consideration other measures which will contribute to prevent the pad marks in a more assured manner, for example, to use shaping molds exclusively for the individual pad compositions, to clean the mold cavities prior to starting a molding operation, to handle starting materials of different types separately in case of batch operations, to prohibit use of a mold releasing agent on mold cavities, and to carry out a series of operations of the pad manufacturing process in a clean environment (e.g., in a clean room).

A synthetic rubber composition falling in the range of Table 1 is formed into suction pads through the same operational steps and procedures as in the conventional pad molding processes, except for the above-mentioned countermeasures and the steps inherent to the present invention.

Briefly, the respective components of the starting pad material, measured into amounts falling in the respective ranges of the above-defined composition, are mixed as they undergo pre-kneading and kneading between rolls, and formed into sheets, which are separately wrapped in polyethylene films and cooled off to room temperature for storage. This sheet material is molded to shape and vulcanized in a mold and, if necessary, subjected to secondary vulcanization in a constant temperature oven to extract residual additives therefrom and retained in a controlled state not to impair the physical properties of the pads.

The suction pads resulting from the secondary vulcanization are wiped with alcohol or the like to defat their surfaces, and then subjected to a halogenation treatment on their entire surfaces or at least on their surfaces to be put in a depressurized state at the time of sucking operation. For a halogenation treatment, each suction pad is put for a predetermined time period in a hermetically sealed container which is filled with a halogen gas such as chlorine gas or the like, or immersed for a predetermined time period in a suitable halogenation liquid such as an aqueous solution of sodium hypochlorite or the like. In case the suction pad is to be treated partially only on its suction surface portions, the treating liquid may be applied only on such surface portions. The time period of the halogenation treatment is normally in the range of from several seconds to several tens seconds.

This treatment intends to chemically transform contaminant substances on or in the vicinity of the pad surfaces into stable substances or to remove such contaminant substances from pad surfaces without giving adverse effects on the rubber material itself of the pad, as a consequence forming a thin halogenation-hardened layer on the pad surfaces and thereby preventing exudation of contaminant substances from the pad and at the same time minimizing its frictional resistance on glass surfaces or other work surfaces to prevent deposition of pad marks effectively. The halogenation surface layer effectively suppresses exudation of oily substances even when the pad surface is put in depressurized condition.

After the halogenation treatment, the suction pad is immediately immersed in a water bath and washed with water, followed by dehydration and drying to obtain a halogenation-treated product. The pad manufacturing process may further include a treatment with hot water, as follows.

In a hot water treatment subsequent to the halogenation treatment, the suction pad is immersed in hot or heated water, preferably in hot or heated water of 65°–100° C. for a time period longer than one minute, generally for a time period of several minutes. This treatment contributes to lower all the more the frictional resistance of the suction pad on work surfaces, thereby effectively preventing transfer of contaminant substances onto work surfaces.

Further, in this connection, as a measure for reducing the frictional resistance of the suction pad on work surfaces for the purpose of preventing deposition of pad marks, the pad material may be prepared to contain 5–20 parts of molybdenum disulfide in its composition or a molybdenum disulfide-containing surface layer may be formed on the suction pad. For adding molybdenum disulfide, a suitable measured amount of molybdenum disulfide of powdery form may be added to the starting rubber material at the kneading stage, or otherwise it may be applied to mold cavities prior to the pad molding operation such that the molded pad will contain a large amount of molybdenum disulfide locally or primarily on the sucking surfaces of the pad.

The addition of molybdenum disulfide is effective for lowering the coefficient of friction of the pads or for enhancing their slickness. However, mobybdenum disulfide will lower the pad strength if its content exceeds the above-mentioned upper limit, and will fail to produce the expected effects in lowering the coefficient of friction to a sufficient degree if its content is smaller than the lower limit.

BRIEF DESCRIPTION OF THE DRAWINGS

In the accompanying drawing:
The sole FIGURE is a sectional view of a suction pad according to the present invention.

BEST MODE FOR CARRYING OUT THE INVENTION

Figure 1:
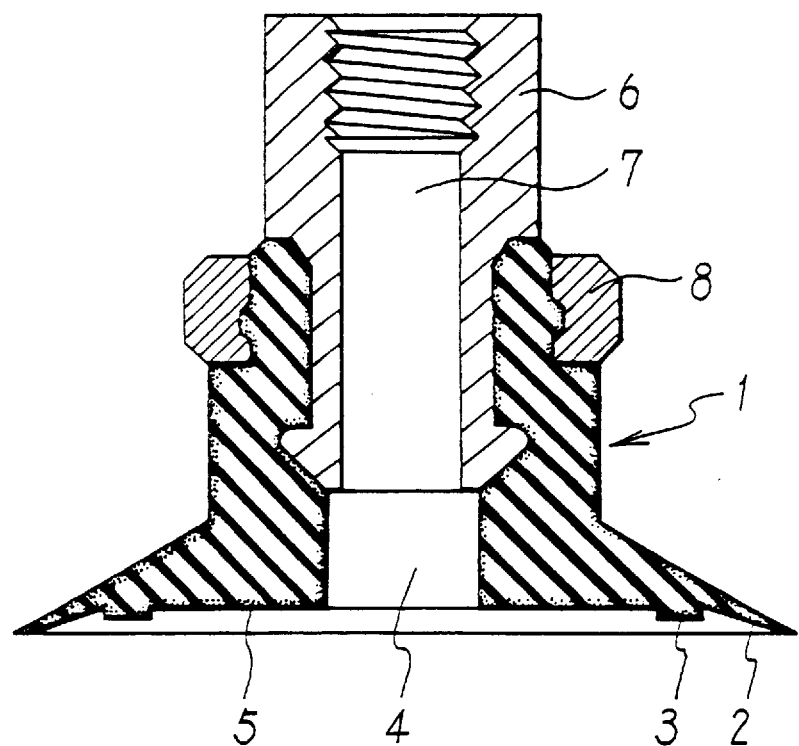

Shown in FIG. 1 is the construction of a suction pad according to the present invention. The suction pad is integrally provided with a lip 2 at and around the marginal edges of a skirt portion of a pad body 1 of synthetic rubber, and with a stopper 3 which is formed on the inner side of the lip 2 and which is abutted against work surface when the lip 2 of the pad is deformed at the time of a sucking operation, along with a suction hole 4 which is opened at the center of the pad in communication with a vacuum source. The pad body 1 is fixedly fitted on a connector member 6 by the use of a fastener ring 8. The connector member 6, which is provided with a center bore 7 to communicate the pad 1 with the vacuum source, is mounted on a suitable drive arm or the like in actual applications. The halogenation-hardened surface layer 5 may be provided only on inner (or lower) pad surfaces, which are to be put in de-pressurized condition at the time of the sucking operation, and on the inner surface of the center hole 4 if desired.

TABLE 2

| Components | Composition (PHR) | |
|---|---|---|
| | Example | Control |
| NBR Polymer | | |
| NIPOL DN211H (N. Zeon Co.) | | 100 |
| JSR N239SV (N. S. Rubber Co.) | 100 | |
| Zinc flower #1 (v. assisting agent) | | 5 |
| Activated zinc flower (v.a. agent) | 5 | |
| Stearic acid (dispersant) | 1 | 1 |
| SRF carbon (reinforcing agent) | 1 | 65 |
| NIPSEAL VN-3 (reinforcing agent) | 25 | |
| DOP (softener) | 0 | 15 |
| Sulfur (vulcanizing agent) | | 1.5 |
| Accelerator TS (v. assisting agent) | | 0.4 |
| Accelerator TR (vulcanizing agent) | 2.5 | |
| Total | 134.5 | 187.9 |

Table 2 above shows an example (employing a contaminant non-transferring synthetic rubber compostion)

Despite slight differences in workability, the polymer (34% medium/high polymer nitrile) used in the Example of Table 2 is substantially same as the polymer (33% medium/high polymer nitrile) used in the Control. Sulfur-free activated zinc flower which is employed as a vulcanization assisting agent in the Example plays a role of an activator to a much greater degree than zinc flower No. 1 of the Control.

With regard to the reinforcing agent, as compared with the Control employs black carbon, the Example of the invention employs white carbon (NIPSEAL VN-3) to expel a source of transferable contaminants while maintaining necessary performance quality of the pad. Further, the composition of the control containts DOP (a softening agent) along with black carbon with a view to maintaining necessary performance quality. In contrast, the composition of the Example aims to maintain satisfactory performance quality without using the softening agent which is considered to be the main source of contaminants. A synthetic rubber composition which incorporates sulfur and TS as a vulcanizer and an accelerator as in the Control belongs to the generally established knowhow, particularly with respect to the physical properties and workability. On the other hand, the composition of the Example utilizes the reaction between activated zinc flower and the accelrator TRA for enhancement of physical properties.

As clear from the foregoing description, the composition employed in the Example of Table 2, according to the present invention, is arranged to suppress the contents of contaminant surbstances, which would otherwise become a cause of pad marks, to a range which will be effective for preventing deposition of pad marks to a satisfactory degree without impairing the physical properties of the synthetic rubber.

In forming suction pads in the above-mentioned Example and Control, the respective components, which had been measured into amounts in the specified ranges, were mixedly kneaded and formed into separate green sheets of 5 mm (thickness)×400 mm(width)×800 mm (length). Each sheet was wrapped in a polyethylene sheet and cooled off to room temperature, followed by temporary storage. Nextly, a necessary measured amount of the sheet was apportioned to each mold which has been previously cleaned by blasting, defatting and drying, followed by molding and vulcanization (for 10 minutes at a temperature of 160° C. and under a pressure 200 kg/cm$^2$ with 3 times of mold gassing).

In case of the suction pad of the Example according to the present invention, secondary vulcanization was conducted at 150° C. for 1 hour. Then, after wiping the pad surfaces with alcohol for defatting, the pad was immersed for 3 seconds in a halogenation liquid ("AFTREAT", a product of Zeon Chemical Industry Co., Ltd.), which contained sodium hypochlorite and chloric acid as major components, to effect a halogenation treatment on the pad. Subsequent to the halogenation treatment, the suction pad was immediately immersed in a water bath and washed with water to a sufficient degree, followed by dehydration and drying to obtain an aimed product.

Part of the above-described suction pads were subjected to a treatment with hot water, immersing them in hot water of 80° C. for 2 minutes and then sending them to dehydration and drying treatments to obtain pad products.

The effect of preventing deposition of pad marks was tested on the suction pads obtained by the above-described Control and the Example of the present invention, more particularly, on the suction pads which had or had not undergone a halogenation treatment with or without a subsequent hot water treatment, by the following method. Namely, after sticking the suction pads on a glass sheet by suction force for 10 minutes, they were removed from the glass surface to check for the existence of pad marks, by blasting moistened air (a breath) toward the glass surface (by the breath-blasting development method) to develop the pad marks into an easily visible state if any.

According to the results of the pad mark test, the suction pads of the Control were found to have imprinted visible pad marks in a slight degree, while the suction pads of the Example were found to have left no visible pad marks on the glass surface.

In case molybdenum disulfide is to be added, it suffices to admix it into the synthetic rubber composition of Table 2 in an amount of 10 parts, which has been confirmed to be effective for lowering the coefficient of friction.

As will be appreciated from the foregoing detailed description of the invention, the deposition of pad marks, which are attributable to exudation of contaminant substances, can be prevented by improvements of the surface treatment of the pad material, that is, by a halogenation treatment of the material, while giving considerations to reduction of the contents of contaminant substances among the components of the pad material. Besides, according to the invention, the coefficient of friction of the pad material is lowered by a hot water treatment subsequent to the halogenation treatment or by addition of molydenum disulfide, thereby preventing transfer of contaminant substances to a work surface more effectively.

Consequently, the present invention makes it possible to apply a vacuum transport mechanism to those goods which have thus far been difficult to use with suction pads due to deposition of pad marks, without necessitating a step of wiping off pad marks in a subsequent stage.

What is claimed is:

1. A method for manufacturing a suction pad designed to be connected to a vacuum source, characterized in that said method comprises the steps of vulcanizing a synthetic rubber material in a pad shaping mold and subjecting the resulting suction pad to a halogenation treatment, wherein said suction pad is formed with a thin halogenation-hardened surface layer in a thickness for suppressing exudation of contaminant components by halogenation treatment at least on a surface to be put in a depressurized state at the time of the vacuum operation and wherein at least on said surface to be put in a depressurized state at the time of said vacuum operation, said suction pad is formed of a material containing 5 to 20 parts of molybdenum disulfide in its composition, or a molybdenum disulfide-containing surface layer.

2. A method as defined in claim 1, further comprising the step of treating said suction pad in hot water after said halogenation treatment.

3. The method of claim 1, wherein said halogenation treatment is selected from the group consisting of contacting said surface layer with a halogen gas, and contacting said surface layer with an aqueous solution of sodium hypochlorite.

4. The method of claim 1, wherein said synthetic rubber is a butadiene-acrylonitrile copolymer.

* * * * *